Feb. 20, 1973 E. EVALDS 3,717,300
TEMPERATURE CONTROL APPARATUS WITH A CYCLICAL DISTRIBUTOR
Filed Oct. 14, 1971
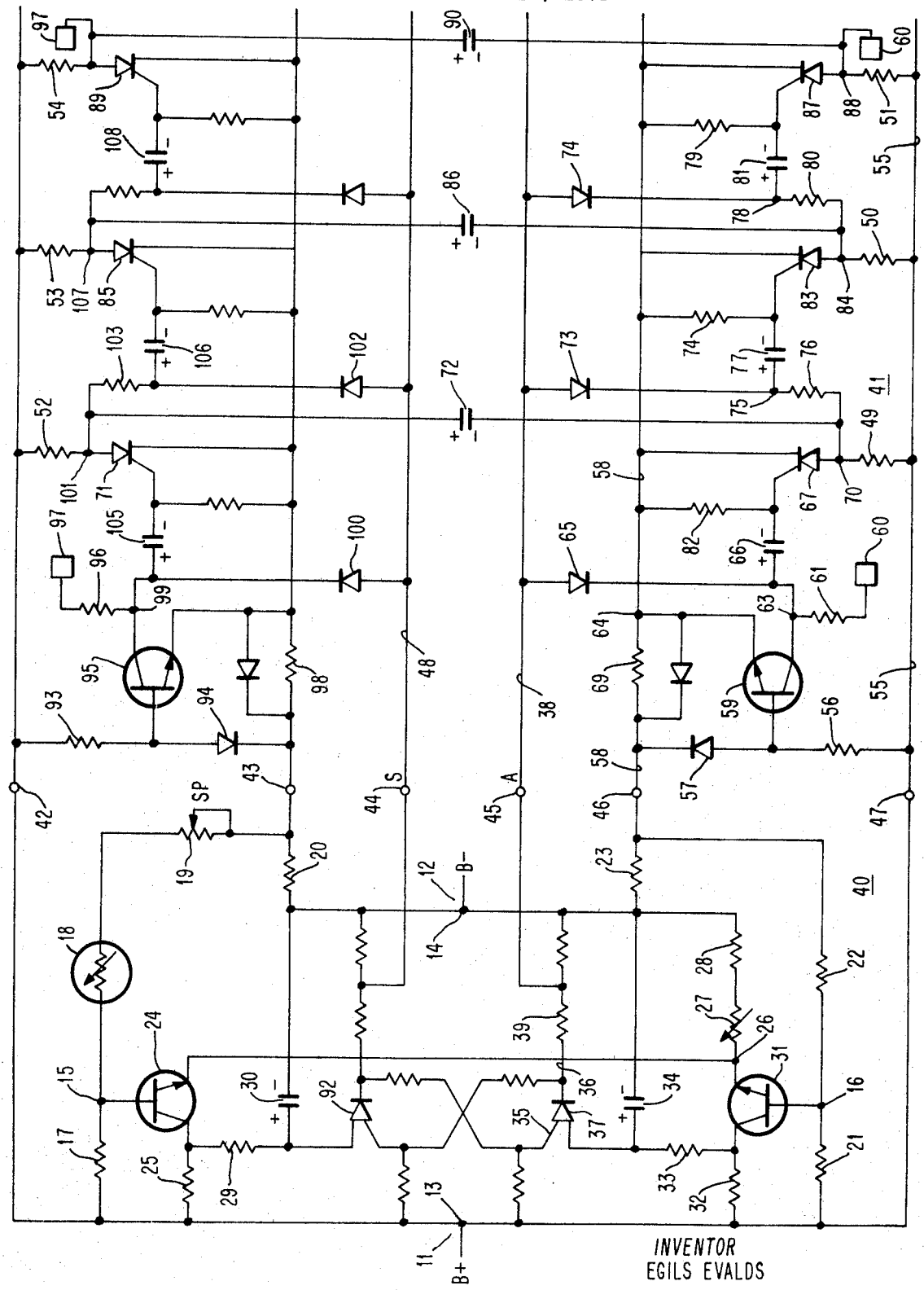
INVENTOR
EGILS EVALDS
BY William E. Cleave
ATTORNEY United States Patent Office 3,717,300
Patented Feb. 20, 1973

3,717,300
TEMPERATURE CONTROL APPARATUS WITH A CYCLICAL DISTRIBUTOR
Egils Evalds, Ardmore, Pa., assignor to Athena Controls, Inc., West Conshohocken, Pa.
Filed Oct. 14, 1971, Ser. No. 189,186
Int. Cl. G05b *11/18;* G05d *23/24*
U.S. Cl. 236—1 E                                11 Claims

ABSTRACT OF THE DISCLOSURE

The present system provides a plurality of individual heater control circuits (or cooling circuits) which are connected together in such a way that the heater control circuits are serially activated to insure substantially equal use of all of the heating sources. The system follows a first on–first off procedure for increasing and decreasing the overall supply of heat.

DESCRIPTION

The present invention relates to a temperature control system and in particular to a system which distributes the heating (or cooling) efforts substantially equally among a plurality of individual sources of heat.

In many applications it is necessary to incrementally add and/or substract supplies of heat in order to initially increase the temperature of the item to be heated or to simply continue to maintain the heat of the item which has been heated at a certain temperature. For instance, in heating hot water for a situation wherein huge amounts of hot water are used, such as in a hospital, hotel, factory or institution related to people it is necessary to apply large amounts of heat at certain times and relatively small amounts of heat at other times. The general way in which this has been accomplished heretofore has been to activate a plurality of heating units each of which produces a comparatively small amount of heat but which collectively produce a large amount of heat. When the large amount of heat is needed many of the heating units are activated and when a small amount of heat is needed only a small number of heating units are activated. If the heating units were activated by electrical energy and if all of the heating units were turned on simultaneously (as was the custom at one time) there would be large surges of electrical current to the heating units and consequently other electrical devices in the building, or even in certain areas in the community, would be temporarily deprived of said electrical current. As a result sometimes circuit breakers were thrown out and devices (such as computers) which were sensitive to line voltage changes would function improperly and accordingly power companies were disenchanted with this type of practice. Possibly as a result of urging by power companies, it has become the procedure to employ a mechanical stepping switch which systematically steps up with a given time period between the steps to "cut in" additional heating elements as they are needed and which incrementally falls back to "cut out" a number of heating elements as they are no longer needed. This procedure has been satisfactory to a point but is undesirable for some applications. First with the mechanical stepper system certain of the heating elements are used many more times than the remainder of the heating elements. Accordingly, there is unequal wear on the heating elements which causes the system to become faulty, i.e., the more frequently used heating elements burn ou twhile the remainder of the heating elements are not used and remain idly intact. Secondly, if there is a power failure there is no certainty what position the stepper system will be in when power is turned back on. If the stepper has a great number of heating elements connected therethrough, there will be a large surge of electrical current when the system is turned on again. Thirdly, the stepper switch system does not distribute the load and accordingly in the course of heating there are resultant hot spots with respect to the item being heated. For instance, if we consider the heating aspect of a system using the stepper switch, we find that the first position (more often the first few positions) is always on as long as the system is providing heat, hence the heating element of the first position (or the first few positions) gets more wear and tear and wears out more frequently than the remainder of the systems. In addition with the first position (or the first few positions) always being on, the item which is being heated has a hot spot at the first position (or first few positions). The present system eliminates the foregoing undesirable aspects and in addition provides for economical control.

SUMMARY

In the present system there is provided electronic circuitry which is temperature responsive and which incrementally adds and subtracts each of the heating elements as the requirement for heating elements is. respectively increased and decreased. However, the system follows a FIFO procedure. In other words, the first heating element which is turned on is also the first heating element to be turned off when there is a signal indicating that the supply of heat should be reduced. Also in accordance with the present system the second heating element which is turned on is also the second heating element which is turned off and so on until each of the heating elements has had its turn at providing heat. The system is cyclical in that the heating unit which is first activated in the chain is the heating unit which is activated after the last heating unit in the chain has had its turn to supply heat.

The objects and features of the present invention will be better understood in accordance with the following description taken in conjunction with the figure.

In the figure there is shown a source of electrical power 11 and 12 represented by well understood symbols B+ and B−. The source 11 and 12 as depicted in the circuit shown is a direct-current source of electrical power. Connected across the source of electrical power 11 and 12 is a bridge circuit. The bridge circuit has input terminals 13 and 14 and output terminals 15 and 16. Upon examination of the figure it can be seen that one leg of the bridge is represented by the resistor 17, a second leg of the bridge is represented by the serial connection of the thermistor 18, the set point resistor 19 and the fixed resistor 20. Also upon inspection of the figure it can be seen that a third leg of the bridge is represented by resistor 21 while a fourth leg of the bridge is represented by the serial connection of fixed resistor 22 and fixed resistor 23. Accordingly, when the system is in operation and power is supplied to the terminals 13 and 14 there is current flow from the terminal 13, through the resistor 17, through the resistors 18, 19 and 20 to the terminal 14 as well as current flow through the resistor 21, through the resistors 22 and 23 to the terminal 14.

The set point resistor 19 is the element which permits the user to determine the temperature about which the system will operate. Assume for a given setting of the set point resistor 19 the thermistor is cold. In other words, the temperature of the item which the thermistor is monitoring is colder than the temperature value to which the set point resistor has been set. If the thermistor 18 is cold, its resistance is high and there is relatively limited current passing through the resistor 17, thermistor 18, resistors 19 and 20 and hence there is a relatively small voltage drop across the resistor 17. With the relatively small voltage drop across the resistor 17, the thermal 15 is at a relatively high voltage and hence the transistor 24 is conditioned to conduct. If the transistor 24 conducts, there will be current flow from the terminal 13, through the resistor 25, through the transistor 24, to the terminal 26, through the variable resistor 27, through the resistor 28 to the terminal 14. If the transistor 24 is conducting fully (i.e., has been completely turned on), there will be virtually no current flow through the resistor 29 to charge up the capacitor 30.

It can be determined from the figure, in view of the foregoing description, that the voltage at point 26 will be virtually the same as the voltage on the collector of the transistor 2 and hence the transistor 31 will not be forward-biased for conduction. Since the transistor 31 is not conducting current will flow through the resistors 32 and 33 to charge up the capacitor 34. When the capacitor 34 has been charged up to a fixed percentage of the voltage which appears across the control element 35 and the cathode 36 of the program unijunction transistor 37 this unijunction transistor 38 will conduct. The required voltage to "fire" the program unijunction transistor 37 can vary and in the preferred embodiment is 75%.

When the unijunction transistor 37 conducts, the capacitor 34 discharges therethrough providing a sharp positive pulse on the add line 38 in response ot the voltage developed across the resistor 39. Upon completion of the discharge of the capacitor 34 the program unijunction transistor 37 terminates its conduction and once again the capacitor 34 commences to build up the charge thereon. When the proper percentage of voltage is developed across the capacitor 34 to "fire" the program unijunction transistor 37, the unijunction transistor will "fire" once again providing a second positive pulse on the add line 38. The resistor 33 and the capacitor 34 provide the RC time constant for firing the program unijunction transistor. In other words, the period of time between "cutting in" or adding the increments of heat is determined in part by the RC time constant developed by the resistor 33 and the capacitor 34.

Before considering the response of the system to the positive pulses on add line 38, it should be noted that the power circuit 40 is connected to the control circuit 41 by the six terminals 42 through 47. The terminal 42 connects the positive side of the supply power to the subtract stages through terminal 42, while the positive side of the supply power is connected to the heating stages through the terminal 48. The subtract stages of the circuit are connected through terminal 43 to the negative side of the supply power while the heating stages are connected through terminal 46 to the negative side of the power supply. The subtract line 48 is connected through the terminal 44 to the bridge circuit while the add line 38 is connected through the terminal 45 to the bridge circuit.

Further before considering the effect of the positive pulses appearing on line 38 consider the structure of the heating (add) and subtract stages. The resistors 49, 50 and 51 represent the load elements of the heater stages. In other words, the resistors 49, 50 and 51 represent either the heaters themselves in the case of small systems or the relays through which the heaters are activated or some other isolating control system to cause the heaters to actually generate heat. The resistors 52, 53 and 54 are the load resistors of the subtract circuits. These last mentioned load resistors merely develop voltages to be used to turn off related heating circuits and do not represent heating elements or relays as do the resistors 49, 50 and 51.

Assume that none of the heating devices has been turned on and none of the subtract circuits has been turned on and that the system is initially starting up. Under these circumstances there will be current flow from line 55, through the resistor 56, through the diode 57, to the line 58. Upon examination it can be seen that the voltage drop across the diode 57 is virtually the same as the voltage drop across the base to emitter junction of the transistor 59, and hence the transistor 59 is biased for transistor action. It should be understood that the terminal 60 shown connected to the resistor 61 is the same as the terminal 60 connected to the resistor 51 of the last stage. Hence with the transistor conducting there is current flow from the line 55, through the resistor 51, through the terminal 60, through the resistor 61 to the collector of the transistor 59 and through the transistor 59. Inasmuch as the voltage drop across the transistor 59 is very small when the transistor 59 is conducting, the voltage at the point 63 is virtually the same voltage as voltage on line 58, in particular, at terminal 64. As will become more apparent hereinafter the circuitry involving the diode 57, the transistor 59 and the resistor 61 is a circuit which enables the first stage of the control circuit to be turned on at the proper time and to be blocked at times when it should not be turned on. As long as the transistor 59 conducts, the capacitor 66 will remain discharged and hence will pass a positive pulse from line 38 to trigger, or turn on, the silicon controlled rectifier 67. As will be explained hereinafter a positive pulse on line 38 will not affect the silicon controlled rectifiers 83 and 87 at this time because the capacitors 77 and 81 are charged.

Now reconsider that there is a positive pulse applied to line 38 when the capacitor 34 discharged in response to the program unijunction transistor 37 conducting. When a positive pulse appears on line 38 there is current flow through the diode 65 to charge the capacitor 66. As was just explained the capacitor 66 is discharged at the time the positive pulse appears on line 38 and hence it passes the positive pulse to provide a positive bias across the silicon controlled rectifier 67, thereby causing said silicon controlled rectifier to conduct. At the same time the capacitor 66 is charged. In response to the silicon controlled rectifier 67 conducting, there is current flow from the line 55, through the resistor 49, through the silicon controlled rectifier 67, to the line 58, through the resistor 69, through the resistor 23 to the negative terminal 14. In accordance with the current flow across the resistor 49, the point 70 goes relatively negative. This last mentioned negative potential is applied to the anode of the silicon controlled rectifier 71 on the subtract side of the circuit. However, since the silicon controlled rectifier 71 had not been conducting the negative voltage developed at point 70 has no effect. Since the silicon controlled rectifier 67 is conducting, the capacitor 72 commences to charge as shown in the figure by the plus-minus signs on the capacitor. If resistor 49 is a heater per se, it commences to generate heat. In the preferred embodiment the resistor 49 is a relay which activates a heating element and hence the first heating unit is supplying heat in response to the first positive signal on add line 38.

It should be understood that during the quiescent state the capacitors 77 and 81 were charged as shown in the drawing with the plus-minus signs. The capacitor 77 was charged by having a sufficient amount of current pass through resistor 49, through the resistor 76 and through the resistor 74 to charge the capacitor 77. However, that current flow was not sufficient to activate the load 49 to either produce heat or to turn on the relay whatever the load might be. In a like fashion, the capacitor 81 was charged as shown during the quiescent state by a minimum amount of current flow through the resistor 50, through the resistor 80 and through the resistor 79 and that current flow was insufficient to activate the load 50. The first positive signal on the add line 38 was applied to the diodes 73 and 74 as well as diode 65 mentioned above. Since the capacitors 77 and 81 are charged as shown, the first positive signal on line 38 did not effect forward biases of the silicon controlled rectifiers 83 and 87. Hence, neither of the SCR's 83 or 87 is turned on. However, with the SCR 67 conducting, the capacitor 77 is discharged which enables it to pass the second positive pulse on add line 38 if there is a second positive pulse.

As was mentioned above the capacitor 66 is continually held discharged so long as the transistor 59 is conducting. However, when the positive pulse is applied to the diode 65 the capacitor 66 is charged as shown and the current flow through the resistor 82 along with the current flow from the conducting silicon controlled rectifier 67 passing across the resistor 69 acts to turn off the transistor 69 thereby leaving the capacitor 66 fully charged. The full charged capacitor 66 blocks the further current flow from the line 55 through the resistors 51 and 61 so that the transistor 59 remains turned off so long as the capacitor 66 is charged or as long as current is passing through resistor 64. It becomes apparent then that once the first stage (SCR 67) is turned on, it cannot be turned on again until capacitor 66 is discharged.

Assume that the thermistor 18 remains sufficiently cold and the capacitor 35 is charged a second time which in turn causes the program unijunction transistor 37 to conduct thereby providing a second positive pulse on the line 38. The arrival of the second positive pulse on the line 38 finds that the diode 65 is not conditioned to pass that pulse because the cathode thereof is biased in a positive sense.

However, the positive pulse last mentioned is able to conduct through the diode 73 because the capacitor 77 has been discharged through the conducting silicon controlled rectifier 67 and hence the point 75 is at approximately the same negative potential as the point 70. In response to the positive signal, on line 38 there is a positive signal transmitted through the capacitor 77 to forward bias the silicon controlled rectifier 83, thereby turing on said silicon controlled rectifier to conduct current through the load 50 to the line 58, through the resistor 69 and through the resistor 23 to the negative terminal 14.

When the silicon controlled rectifier 83 commences conducting, the point 84 becomes relatively negative and the negative pulse is transmitted to the diode or silicon controlled rectifier 85 on the subtract side but since that silicon controlled rectifier 85 is not conducting there is no effect. In the meantime in response to the silicon controlled rectifier 83 conducting the capacitor 86 charges as shown in the figure. Further, in accordance with the conduction of the silicon controlled rectifier 83 the capacitor 81 discharges and hence the diode 74 will be respective to the next positive pulse applied to line 38.

Assume further that despite the heat supplied by the loads 49 and 50 the thermistor 18 has not reached the temperature desired, so that the capacitor 34 is subjected to a third charging experience which causes the program unijunction transistor 37 to conduct and thereby provides a third positive pulse on line 38. The third positive pulse on line 38 of course cannot pass through the diodes 65 and 73 and have any effect because the SCR's 67 and 83 are already conducting. However, the positive pulse does pass through the diode 84 to turn on the silicon controlled rectifier 87 thereby conducting current from the line 55 through the load resistor 51 through the silicon controlled rectifier 87 to the line 58, through the resistor 69 and through the resistor 23 to the negative terminal 14. Accordingly, the third load resistor 51 has been activated and there is an additional heating unit supplying heat. As was true in the previous description, the conduction of current through the resistor 51 causes the point 88 to go relatively negative which negative potential is reflected to the subtract side and specifically to the anode of the silicon controlled rectifier 89. However, inasmuch as the last mentioned silicon controlled rectifier is not conducting there is no effect. In the meantime the capacitor 90 becomes charged as shown in the drawing. Simultaneously the negative potential developed at the point 88 is reflected through the terminal 60 back to the point 63 to discharge the capacitor 66 but inasmuch as the silicon controlled rectifier 67 is conducting in our example any further positive pulses would have no effect thereon.

It should be understood while there are only three stages shown on the heater side of the circuit there could be many, many stages and each would have an interconnecting component including a capacitor such as capacitor 86, a diode similar to the diode 74, a silicon controlled rectifier similar to silicon controlled rectifier 83 and an RC time constant circuit, similar to the circuit made up of capacitor 77 and resistor 74. It also should be understood that the last stage of such a control circuit array would be connected back to the first stage through a circuit similar to the terminal 60 in the drawing.

Assume a second example where the thermistor 18 is virtually at the proper temperature and it becomes necessary to employ add signals on line 38 as well as subtract signals on line 48. Under this set of conditions initially the thermistor 18 is considered cold and there is an add signal genated on line 38 as just described thereby turning on the silicon controlled rectifier 67 as previously described. Consider further that there is a second add signal generated on line 38 which turns on the silicon controlled rectifier 83 as previously described. Now consider that the heat generated by the effects of the loads 49 and 50 is sufficient to heat up the item, which thermistor 18 is monitoring, so that the resistance of the thermistor 18 is decreased and the potential of the point 15 becomes sufficiently negative to turn off the transistor 24. Accordingly, as described in connection with the positive signals on line 38, there will be a subtract signal generated in response to capacitor 30 becoming charged and turning on the program unijunction transistor 92.

Bear in mind that the blocking circuit made up of the resistor 93, diode 94, transistor 95, resistor 96, terminal 97 and resistor 98 is similar to the blocking circuit on the heating side and operates in the same way. Under such circumstances the transistor 95 will be conducting, the capacitor 105 will be discharged and the terminal 99 will be relatively negative, so that when the positive signal is applied to the subtract line 48 it will pass through the diode 100 to turn on the silicon controlled rectifier 71.

In response to the conduction of the silicon controlled rectifier 71 there will be current flow through the load resistor 52 thereby reducing the potential of the point 101. When the point 101 goes relatively negative the potential across the capacitor 72 is measured from a relatively negative potential and hence there is a sharp negative signal applied to the anode of the silicon controlled rectifier 67, on the heater side, thereby turning off that silicon controlled rectifier and cutting out the first stage heater from the circuit. This last mentioned negative signal through the capacitor 72 has no effect on the second stage of the heater and hence the second stage heater circuit is still conducting and providing heat. Simultaneously, of course, the capacitor 106 commences to discharge through the SCR 71. At the same time transistor 95 is turned off by the voltage developed across the resistor 98 which back biases the transistor 95. As long as any one of the SCR's 71, 85 or 89 conducts, the transistor 95 will remain turned off.

Consider in response to this foregoing situation that the item which is being monitored becomes sufficiently cool that once again the transistor 24 is turned on and the transistor 31 is turned off thereby creating a positive signal (add heat) on line 38. As long as the silicon controlled rectifier 83 is conducting there will be current flow across the resistor 69 which will keep the transistor 59 from conducting and hence there is no path to discharge the capacitor 66 so that this next add signal will have no effect on the first stage. In other words, this positive signal which is being generated on line 38 will not be transmitted through the diode 65 to turn on the silcon controlled rectifier 67. Accordingly, the first stage 49 will not be turned on at this time. However, with the silicon controlled rectifier 83 conducting, capacitor 81 will be discharged and hence the third positive signal applied to the add line will be transmitted through the diode 74 to turn on the silicon controlled rectifier 87. It should be noted now that the second and third heating stages are activated and the first heating stage is turned off thereby distributing the load among the first, second and third stages evenly.

When the next subtract signal comes in it will be favorably received through the diode 102 since the terminal 103 appears negative and this positive add signal will be transmitted to the control element of the silicon controlled rectifier 87, thereby turning on this last mentioned SCR.

Assume that conditions are such that with the second and third stages providing heat, the thermistor 18 senses heat in excess of the value set on the set point resistor 19. Accordingly, transistor 24 will be turned off and transistor 31 turned on with a resultant "subtract" signal produced on line 48. This will be the second subtract signal in our example.

As was mentioned above when SCR (silicon controlled rectifier) 71 was turned on in response to the first "subtract" signal, capacitor 106 was discharged and the second subtract stage was made ready to accept the second subtract signal. When the second subtract signal appears on line 48 it forward biases the SCR 85 thereby causing SCR 85 to conduct. When SCR 85 conducts the point 107 goes negative thereby causing the point 84 to go relatively very negative because of the charge developed on capacitor 86. When the anode of SCR 83 goes negative this silicon controlled rectifier becomes turned off. Hence only the third heater stage is conducting while the first and second subtract stages are conducting. Bear in mind that when the SCR 85 was turned on, capacitor 108 was discharged making the third subject stage ready to accept and be responsive to the third subtract pulse.

Assume now that the item being heated cools to a point where more heat is warranted. The resistance of the thermistor 18 will increase thus turning on transistor 24 and providing an "add" pulse on line 38 as described earlier. When the silicon controlled rectifier 87 was turned on in response to the third "add" pulse, a discharge path for capacitor 66 was provided. The discharge path for capacitor 66 was through resistor 61, the terminal 60, SCR 87, resistor 82 to the other side of capacitor 66. Hence the diode 65 is conditioned to accept or pass the fourth "add" pulse. When the fourth "add" pulse is generated it turns on SCR 67 thus providing current to the load resistor 49.

During the period that the SCR 67 was turned off and SCR 71 was turned on, the capacitor 72 was charged in the opposite direction from that shown in the drawing. Hence when SCR 67 conducts the point 70 will go negative and the point 101 will go relatively very negative thereby turning off SCR 71. At this point in our example the first and third heater stages are turned on and the second subtract stage is turned on.

If we assume now that the system requires a third subtract pulse it will be generated as earlier described and will act to turn on SCR 89. The conduction of SCR 89 results in turning off SCR 87 on the heater side; discharging capacitor 105 to make the first subtract stage ready for the fourth subtract pulse; and reversing the charge on capacitor 90.

It should be apparent from the foregoing description that each of the load resistors 49, 50 and 51 takes it turn supplying the heating action which distributes the wear and tear on the load apparatus and which eliminates hot spots because physically the heat source is distributed. Bear in mind that in actual practice there is normally more than three stages and as long as one stage is conducting on each side, the system will continue its cyclical advance until the last stage advances the control activity back to the first stage.

If there is a power failure all of the stages are turned off and when the power returns the system starts with no stages turned on and hence no surges of current.

The provision of resistors 23 and 20 makes the system anticipatory of a change, either addition or subtraction. For instance, if only one heating stage is turned on the voltage developed across resistor 23 would not be as high as it would be if three heating stages were turned on. If three heating stages are turned on there is an increased possibility of heating inertia, i.e., the item might be heated beyond the temperature that was intended as the desired value. However, as the heating stages are cut in, that is, as they are added to the activated group, the voltage value of point 46 increases which in turn increases the voltage value of point 16. The high voltage at point 16 causes the transistor 31 to partially conduct (and increasingly conduct as increased heaters are turned on) which in turn increases the period between "add" pulses because it takes capacitor 34 longer to charge up with a reduced current flow thereto. Accordingly, the system is anticipating the switch over from adding heat sources to subtracting heat sources. By similar analysis the anticipatory characteristic is found on the subtract side of the circuit through the voltage developed across the resistor 20.

The present system is designed to distribute the work load even when the desired temperature has been obtained. Under the circumstances described thus far it is conceivable that in a hot water system the hot water could be drawn from the tank at a rate that would require simply the continued heating by two heating elements in order to maintain a constant temperature. If the bridge circuit reached a balanced condition and the combined resistance value of resistors 18 and 19 equalled the resistance value of resistor 22 then currents through transistors 24 and 31 would be equal. Accordingly, the charging rates of capacitors 30 and 34 would be equal. Under the foregoing circumstances if the combined resistance of resistors 27 and 28 is low then the currents through transistors 24 and 31 would be high and neither capacitor 30 or 34 would charge up sufficiently high to trigger their associated program unijunction transistors. Hence there would not be any add or subtract pulses until there was a temperature change. Such an arrangement could be useful for long relay life but it would tend to have the same heating units "on" for long periods of time and thereby develop hot spots and fail to distribute the load.

However, if the resistance value of resistor 27 is increased, the current through the transistors 24 and 31 will decrease. This arrangement will provide additional current to charge the capacitors 30 and 34. In response to capacitors 30 and 34 charging up the program unijunction transistors 37 and 92 conduct to produce, respectively, add and subtract pulses. Because of the cross coupling between program unijunction transistor 37 and program unijunction transistor 92, these transistors are regulated so they will not conduct at the same time. In other words with resistor 27 set at a relatively high resistance value, periodic add and subtract signals are generated and the source of heat becomes distributed because the active stages are shifted cyclically.

In a further arrangement the system can be employed as a vernier control or altered to a vernier control when balance is established. If the resistance of resistor 27 is made high the capacitors 30 and 34 will charge rapidly and the add and subtract transistors will be turned on or have their conduction increased in response to the slightest temperature change. Under these circumstances a step of heat is "time proportioned", i.e., a heating unit may be "on" and a second heating unit may be turned on for only ⅓ of the time that the first unit was on before they are both turned off. All sorts of combinations are possible In this way there is a fine tuning of the heat applied.

By having the resistor 27 variable, the system can operate until a balanced condition is attained, i.e., the water supply is heated and then any of the three modes of operation just described can be employed by simply adjusting resistor 27.

While the present system has been described in connection with a heating system it should be understood that it can be readily employed with a cooling system. In other words, if the load resistor 49, 50 and 51 are considered as relays for activating compressors or other forms of cooling devices the system is readily adaptable.

I claim:

1. A temperature control system employing a plurality of heating units comprising in combination: a source of electrical power; temperature responsive circuit means; add signal generating means connected to said temperature responsive circuit means to produce add signals in response to predetermined temperature conditions; subtract signal generating means connected to said temperature responsive circuit means to produce subtract signals in response to predetermined temperature conditions; a plurality of heating unit stages arranged in succeeding order from a first stage through a last stage, each heating unit stage formed to be turned on in response to the coincidence of an add signal applied thereto and the presence of its preceding heating unit stage being turned on; a plurality of subtract unit stages arranged in similar succeeding order, each subtract unit stage having a counterpart heating unit stage and being formed to be turned on in response to the coincidence of a subtract signal applied thereto and the presence of its preceding subtract unit stage being turned on; first circuitry means connecting said plurality of heating unit stages to said add signal generating means; second circuitry means connecting said plurality of subtract unit stages to said subtract signal generating means; and third circuitry means connecting each subtract unit stage to its counterpart heating unit stage whereby when a heating unit stage is turned on a turn off signal is transmitted through said third circuitry means to turn off the counterpart subtract unit stage of said last mentioned heating unit stage and whereby when a subtract unit stage is turned on a turn off signal is transmitted through said third circuitry means to turn off the counterpart heating unit stage of said last mentioned subtract unit stage.

2. A temperature control system according to claim 1 wherein said temperature responsive circuit means is a bridge circuit having a thermistor connected in one leg thereof.

3. A temperature control system according to claim 1 wherein said temperature responsive circuit means has first and second input terminals and first and second output terminals and wherein said add signal generating means comprises a transistor having an input element, an output element and a control element, said input element connected to said first input terminal, said input element is fourth circuitry connected to said second input terminal, and said control element connected to said first output terminal and further wherein said add signal generating means includes a capacitor connected between said input element of said last mentioned transistor and said second input terminal, and wherein said add signal generating means further include a current switching means connected to discharge said last mentioned capacitor in response to a predetermined voltage developed thereacross whereby an add signal is generated each time said last mentioned capacitor is charged.

4. A temperature control system according to claim 1 wherein said temperature responsive circuit means has first and second input terminals and first and second output terminals and wherein said subtract signal generating means includes a transistor having an input element, an output element and a control element and wherein said input element is connected to said first input terminal, said output element is fourth circuitry connected to said second input, said control element is connected to said first output terminal, and further wherein said subtract signal generating means includes a capacitor connected between said input element of said last mentioned transistor and said second input terminal, wherein there is further included a current switching means connected to discharge said last mentioned capacitor in response to a predetermined voltage developed thereacross whereby a subtract signal is generated each time said last mentioned capacitor discharges.

5. A temperature control system according to claim 4 wherein said current switching means is a program unijunction transistor and wherein there is further included cross coupling circuitry between said last mentioned program unijunction transistor and said add signal generating means to prevent said last mentioned program unijunction transistor and said add signal generating means for turning on at the same time.

6. A temperature control system according to claim 2 wherein there is further included in said bridge circuit means a variable resistor whose different resistance values are equated to different temperature values and whose setting determines the relationship between the desired temperature about which the system operates and the voltages developed at the output means of said bridge circuit.

7. A temperature control system according to claim 1 wherein the last heater unit stage in said succeeding order is connected to be the preceding stage of the first heater unit stage in said succeeding order and wherein the last subtract unit stage of said succeeding order is circuitry connected to be the preceding stage of the first subtract unit stage in said succeeding order.

8. A temperature control system according to claim 7 wherein there is further included initial turn on and blocking circuitry connected to said first heater unit stage whereby said initial turn on and blocking circuitry enables said first heater unit stage to be initially turned on and whereby said blocking unit circuitry renders said first heater unit stage non-responsive once it has been turned off until said last heater unit stage has been turned on.

9. A temperature control system according to claim 1 wherein each heater unit stage includes a diode, a current switching means, a heater unit load, and a capacitor having first and second terminals with said first terminal serially connected to the cathode of said diode and said second terminal serially connected to the said current switching means and wherein each heater unit further includes a first resistor means connected between said second terminal of said capacitor and said temperature responsive circuit means, and a second resistor connected from said first terminal of said capacitor to the heater unit load of its preceding stage.

10. A temperature control circuit according to claim 1 wherein said add signal generating means and said subtract signal generating means are common connected through variable resistance means whereby the current through said add signal generating means and said subtract signal generating means can be varied to generate add and subtract pulses at a different rate in accordance with said variable resistance setting.

11. A temperature control system employing a plurality of heating units comprising in combination:
 (a) source of electrical power;
 (b) bridge circuit means having first and second input terminals and first and second output terminals, said first and second input terminals connected to said source of electrical power;
 (c) temperature responsive means connected into one leg of said bridge circuit means;
 (d) first pulse generating means having control means connected to said first output terminal;
 (e) second pulse generating means having control means connected to said second output terminal;
 (f) interconnecting circuitry means connecting said first pulse generating means with said second pulse generating means whereby said first pulse generating means generates first pulses in response to predetermined voltages appearing on said first and second output terminals and whereby said second pulse generating means generates second pulses in response to predetermined voltages appearing on said second and first output terminals;
 (g) a plurality of heating unit loads arranged in N succeeding stages;
 (h) a plurality of first current switching means each assigned to a different heating unit load stage and each having input means, output means, and control means, each of said last mentioned input means connected to said heating unit load of its assigned stage, each of said last mentioned output means connected to said second input terminal of said bridge circuit means whereby each of said heating unit loads is turned on in response to the first current switching means of its assigned stage being turned on;

(i) a plurality of first pulse responsive means with each assigned to a different heating unit load stage and each of said first pulse responsive means respectively connected to said control means of the first current switching means assigned to its stage whereby each of said first current switching means is turned on in response to the first pulse responsive means of its assigned stage being responsive to a pulse;

(j) first circuitry means connecting said plurality of first pulse responsive means to said first pulse generating means whereby each time one of said first pulses is generated, the first pulse responsive means of a stage whose preceding stage has its heater unit load turned on, will be responsive thereto;

(k) second circuitry means connecting each of said heating unit loads respectively to the first pulse responsive means of the stage succeeding said heating unit's assigned stage;

(l) a plurality of subtracting unit loads arranged in N succeeding stages with each of said last mentioned stages having a counterpart stage in said N succeeding stages of heater unit loads;

(m) a plurality of second current switching means, each assigned to a different subtract unit load stage and each having input means, output means, and control means, each of said last mentioned input means respectively connected to the subtract unit load of its assigned stage, each of said last mentioned output means connected to said second input terminal of said bridge circuit means;

(n) a plurality of second pulse responsive means with each assigned to a different subtract unit load stage and each of said second pulse responsive means connected to the control means of the second current switching means assigned to said second pulse responsive means' stage;

(o) third circuitry means connecting said plurality of second pulse responsive means to said second pulse generating means;

(p) fourth circuitry means respectively connecting each of said subtract unit loads to the second pulse responsive means of the stage succeeding said subtract unit load's assigned stage;

(q) fifth circuitry means connecting each subtract unit load to the heater unit load of its counterpart heater unit load stage whereby each time a heater load unit is turned on a signal will be transmitted through said fifth circuitry means to its counterpart stage to turn off the subtract unit load is in fact turned on, and whereby each time a subtract unit load is turned on a signal will be transmitted through said fifth circuitry means to its counterpart stage to turn off the heater unit load thereat if in fact said heater unit load is turned on.

References Cited

UNITED STATES PATENTS 3,566,147  2/1971  Masreliez _____ 307—39 X
3,302,070  1/1967  Burley _____ 307—39 X WILLIAM E. WAYNER, Primary Examiner U.S. Cl. X.R.

219—486; 236—78; 307—39